(12) United States Patent
Shioiri et al.

(10) Patent No.: US 10,563,710 B2
(45) Date of Patent: Feb. 18, 2020

(54) SELECTABLE ONE-WAY CLUTCH

(71) Applicants: TOYOTA JIDOSHA KABUSHIKI KAISHA, Toyota-shi, Aichi-ken (JP); Means Industries, Inc., Saginaw, MI (US)

(72) Inventors: Hiroyuki Shioiri, Yokohama (JP); Brice Pawley, Midland, MI (US)

(73) Assignees: TOYOTA JIDOSHA KABUSHIKI KAISHA, Toyota-shi (JP); MEANS INDUSTRIES INC., Saginaw, MI (US)

(*) Notice: Subject to any disclaimer, the term of this patent is extended or adjusted under 35 U.S.C. 154(b) by 115 days.

(21) Appl. No.: 15/727,844

(22) Filed: Oct. 9, 2017

(65) Prior Publication Data

US 2018/0266502 A1 Sep. 20, 2018

Related U.S. Application Data

(60) Provisional application No. 62/472,836, filed on Mar. 17, 2017.

(51) Int. Cl.
*F16D 41/12* (2006.01)
*B60K 6/383* (2007.10)

(52) U.S. Cl.
CPC .............. *F16D 41/12* (2013.01); *B60K 6/383* (2013.01); *Y10S 903/913* (2013.01)

(58) Field of Classification Search
CPC ...... F16D 41/12; Y10S 903/913; B60K 6/383
See application file for complete search history.

(56) References Cited

U.S. PATENT DOCUMENTS

| 2,947,537 A | 8/1960 | Littell et al. |
| 2,959,062 A | 11/1960 | Looker |
| 4,050,560 A | 9/1977 | Torstenfelt |
| 4,340,133 A | 7/1982 | Biersch |
| 4,651,847 A | 3/1987 | Hermanns |

(Continued)

FOREIGN PATENT DOCUMENTS

WO 2016168075 A1 10/2016

OTHER PUBLICATIONS

International Searching Authority, International Search Report and the Written Opinion for International Application No. PCT/US2018/33604, dated Aug. 24, 2018.

*Primary Examiner* — Huan Le
(74) *Attorney, Agent, or Firm* — Hunton Andrews Ku

(57) ABSTRACT

A selectable one-way clutch includes a pocket plate having accommodating recessed portions; engaging pieces accommodated in the accommodating recessed portions; a notch plate relatively rotatable with respect to the pocket plate, and having engaging recessed portions; and a selector plate between the pocket plate and the notch plate, including window holes and switches a state where the engaging pieces pass through the window holes and rise, and a state where the engaging pieces are accommodated in the accommodating recessed portions. Further, the engaging pieces include groove portions formed in centers of the selectable one-way clutch, the selector plate includes protruding portions protruding from inner surface of the window holes, and the protruding portions are fit into the groove portions, and the engaging pieces and the selector plate are layered in a rotation axis direction of the selectable one-way clutch, when the selectable one-way clutch is not engaged.

8 Claims, 11 Drawing Sheets

(56) References Cited

U.S. PATENT DOCUMENTS

| | | | |
|---|---|---|---|
| 5,927,455 | A | 7/1999 | Baker et al. |
| 6,193,038 | B1 | 2/2001 | Scott et al. |
| 6,244,965 | B1 * | 6/2001 | Klecker ................. F16D 41/12 192/43.1 |
| 6,290,044 | B1 | 9/2001 | Burgman et al. |
| 6,607,292 | B2 | 8/2003 | Gutierrez et al. |
| 6,905,009 | B2 | 6/2005 | Reed et al. |
| 7,198,587 | B2 | 4/2007 | Samie et al. |
| 7,258,214 | B2 | 8/2007 | Pawley et al. |
| 7,275,628 | B2 | 10/2007 | Pawley et al. |
| 7,344,010 | B2 | 3/2008 | Fetting, Jr. et al. |
| 7,484,605 | B2 | 2/2009 | Pawley et al. |
| 7,491,151 | B2 | 2/2009 | Maguire et al. |
| 7,643,801 | B2 | 1/2010 | Piirainen |
| 7,743,678 | B2 | 6/2010 | Wittkopp et al. |
| 7,766,790 | B2 | 8/2010 | Stevenson et al. |
| 7,942,781 | B2 | 5/2011 | Kimes |
| 7,992,695 | B2 | 8/2011 | Wittkopp et al. |
| 8,051,959 | B2 | 11/2011 | Eisengruber |
| 8,061,496 | B2 | 11/2011 | Samie et al. |
| 8,079,453 | B2 | 12/2011 | Kimes |
| 8,087,502 | B2 | 1/2012 | Samie et al. |
| 8,196,724 | B2 | 6/2012 | Samie et al. |
| 8,272,488 | B2 | 9/2012 | Eisengruber et al. |
| 8,286,772 | B2 | 10/2012 | Eisengruber |
| 8,602,187 | B2 | 12/2013 | Prout |
| 8,844,693 | B2 | 9/2014 | Pawley |
| 9,121,454 | B2 | 9/2015 | Pawley |
| 9,188,170 | B2 | 11/2015 | Prout et al. |
| 9,188,174 | B2 | 11/2015 | Beiser et al. |
| 9,377,061 | B2 | 6/2016 | Kimes et al. |
| 2004/0238306 | A1 | 12/2004 | Reed et al. |
| 2006/0185957 | A1 | 8/2006 | Kimes et al. |
| 2006/0231366 | A1 * | 10/2006 | Meggiolan ............. F16D 41/30 192/64 |
| 2007/0034470 | A1 | 2/2007 | Fetting, Jr. et al. |
| 2007/0278061 | A1 | 12/2007 | Wittkopp et al. |
| 2008/0000747 | A1 | 1/2008 | Saka |
| 2008/0110715 | A1 | 5/2008 | Pawley |
| 2008/0169165 | A1 | 7/2008 | Samie et al. |
| 2008/0169166 | A1 | 7/2008 | Wittkopp et al. |
| 2008/0185253 | A1 | 8/2008 | Kimes |
| 2008/0223681 | A1 | 9/2008 | Stevenson et al. |
| 2009/0159391 | A1 | 6/2009 | Eisengruber |
| 2009/0194381 | A1 | 8/2009 | Samie et al. |
| 2009/0211863 | A1 | 8/2009 | Kimes |
| 2009/0255773 | A1 | 10/2009 | Seufert et al. |
| 2010/0018795 | A1 | 1/2010 | Samie et al. |
| 2010/0022342 | A1 | 1/2010 | Samie et al. |
| 2010/0200358 | A1 | 8/2010 | Eisengruber et al. |
| 2010/0230226 | A1 | 9/2010 | Prout |
| 2010/0025594 | A1 | 10/2010 | Samie et al. |
| 2010/0252384 | A1 | 10/2010 | Eisengruber |
| 2011/0177900 | A1 | 7/2011 | Simon |
| 2011/0183806 | A1 | 7/2011 | Wittkopp et al. |
| 2011/0192697 | A1 | 8/2011 | Prout et al. |
| 2012/0090952 | A1 | 4/2012 | Lee et al. |
| 2012/0145505 | A1 | 6/2012 | Kimes |
| 2012/0145506 | A1 | 6/2012 | Samie et al. |
| 2012/0152683 | A1 | 6/2012 | Kimes |
| 2012/0152687 | A1 | 6/2012 | Kimes et al. |
| 2014/0190785 | A1 | 7/2014 | Fetting et al. |
| 2014/0378266 | A1 | 12/2014 | Bockenstette et al. |
| 2015/0000442 | A1 | 1/2015 | Kimes et al. |
| 2015/0001023 | A1 | 1/2015 | Kimes et al. |
| 2015/0014116 | A1 | 1/2015 | Kimes et al. |
| 2015/0105205 | A1 | 4/2015 | Kurosaki et al. |
| 2015/0211587 | A1 | 7/2015 | Kimes et al. |
| 2016/0047439 | A1 | 2/2016 | Kimes et al. |
| 2016/0129864 | A1 | 5/2016 | Essenmacher |
| 2016/0131205 | A1 | 5/2016 | Essenmacher |
| 2016/0131206 | A1 | 5/2016 | Essenmacher |
| 2016/0160941 | A1 | 6/2016 | Green et al. |
| 2016/0160942 | A1 | 6/2016 | Shioiri et al. |
| 2016/0186818 | A1 | 6/2016 | Shioiri et al. |
| 2016/0223072 | A1 | 8/2016 | Miyake |
| 2016/0230819 | A1 | 8/2016 | Shioiri et al. |
| 2016/0245346 | A1 | 8/2016 | Shioiri et al. |
| 2016/0250917 | A1 | 9/2016 | Shibata et al. |
| 2016/0265605 | A1 | 9/2016 | Tomita et al. |
| 2016/0273595 | A1 | 9/2016 | Shioiri et al. |
| 2016/0290416 | A1 | 10/2016 | Hibino |
| 2016/0339775 | A1 | 11/2016 | Shioiri et al. |
| 2016/0339908 | A1 | 11/2016 | Komada et al. |
| 2016/0341263 | A1 | 11/2016 | Shioiri et al. |
| 2016/0348742 | A1 | 12/2016 | Yasui et al. |
| 2016/0363179 | A1 | 12/2016 | Yasui et al. |
| 2016/0369855 | A1 | 12/2016 | Essenmacher |
| 2016/0375754 | A1 | 12/2016 | Kurosaki et al. |
| 2016/0377126 | A1 | 12/2016 | Essenmacher |
| 2017/0002877 | A1 | 1/2017 | Shioiri et al. |
| 2017/0037914 | A1 | 2/2017 | Hibino et al. |
| 2017/0050636 | A1 | 2/2017 | Shibata et al. |
| 2017/0059033 | A1 | 3/2017 | Shioiri et al. |
| 2017/0066317 | A1 | 3/2017 | Kurosaki et al. |

* cited by examiner

SELECTABLE ONE-WAY CLUTCH

CROSS-REFERENCE TO RELATED APPLICATION

The present application claims priority to U.S. Provisional Patent Application No. 62/472,836 filed on Mar. 17, 2017, which is incorporated herein by reference in its entirety.

TECHNICAL FIELD

The present disclosure relates to a selectable one-way clutch.

BACKGROUND

As a one-way clutch, for example, U.S. Pat. No. 8,844,693 discloses a selectable one-way clutch including a pocket plate in which a strut (engaging piece) is accommodated in a plurality of pockets (accommodating recessed portions), a notch plate in which a plurality of notches (engaging recessed portions) for allowing the strut to be engaged with are formed, and a selectable plate positioned between the pocket plate and the notch plate.

SUMMARY

According to an embodiment of the present disclosure, a selectable one-way clutch is disclosed which includes a pocket plate having a plurality of accommodating recessed portions formed on one surface; engaging pieces that are accommodated in the respective accommodating recessed portions, a notch plate relatively rotatable with respect to the pocket plate, and having a plurality of engaging recessed portions formed on a surface facing the one surface of the pocket plate, and a selector plate positioned between the pocket plate and the notch plate, including a plurality of window holes penetrating the selector plate in a plate thickness direction, and configured to switch a state in which the engaging pieces pass through the window holes and rise from a side of the pocket plate to a side of the notch plate, and a state in which the engaging pieces are accommodated in the respective accommodating recessed portions, by being rotated coaxially with a rotation axis of the notch plate. Further, the engaging pieces include respective groove portions formed in centers in a radial direction of the selectable one-way clutch, the selector plate includes a plurality of protruding portions protruding from respective inner surface of the window holes along a forming direction of the groove portion, and the protruding portions are fit into the respective groove portions, and the engaging pieces and the selector plate are layered in a rotation axis direction of the selectable one-way clutch, when the selectable one-way clutch is not engaged.

DETAILED DESCRIPTION

Figure 1A:
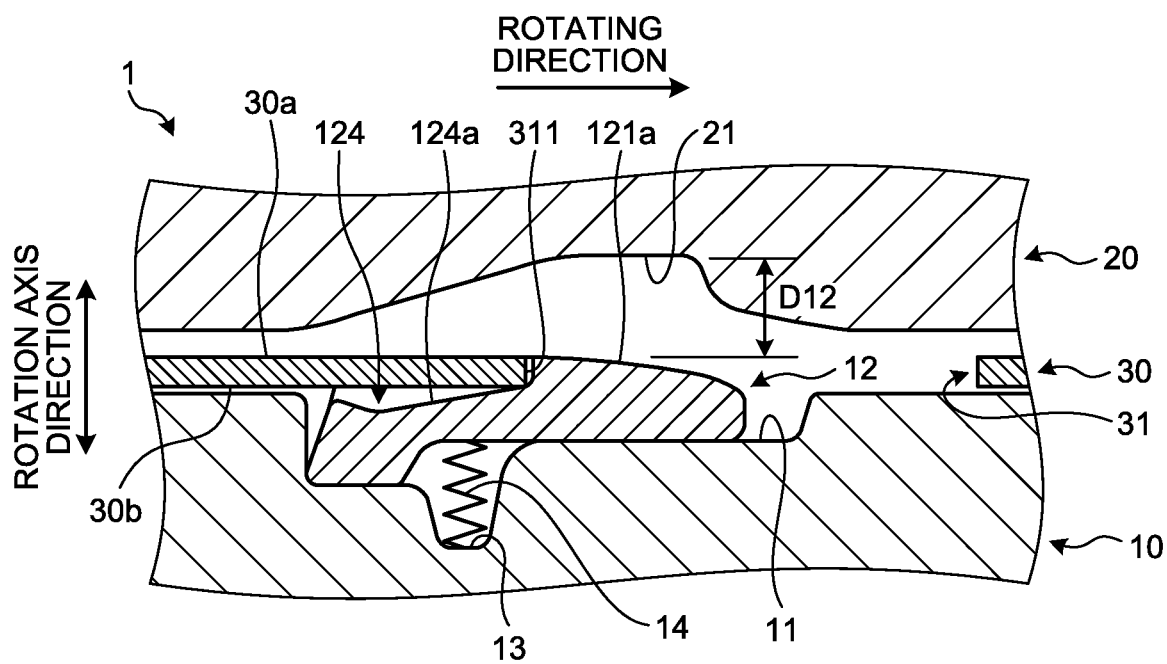
FIG. 1A is a diagram illustrating a configuration of a principal portion of a selectable one-way clutch according to a first embodiment of the present disclosure, and is a sectional view illustrating a state when the selectable one-way clutch is not engaged.

When a hybrid vehicle (HV vehicle) in which a selectable one-way clutch in the related art is mounted performs EV travel, for example, the notch plate may be rotated in a reverse direction (hereinafter, referred to as "overrun direction") to an engaging direction of the selectable one-way clutch, that is, a direction into which the strut is meshed with the notch (hereinafter, this state is referred to as "overrun").

In overrun, an action of a reciprocating collision of the strut between the pocket plate and the notch plate occurs. If such an action of a reciprocating collision becomes intense, a large yaw moment "My" and translational force "F1" occur in a strut 52, as illustrated, for example, in FIGS. 14 and 15. As a result, a pair of ear portions (an inner-ear portion 522 and an outer-ear portion 523) of the strut 52 repeatedly collides with an inner surface 11a of a pocket 11 of a pocket plate 10, as illustrated in the A portions of FIG. 14 and the B portions of FIG. 15, and the service lifetime of the strut 52 may be reduced.

The present disclosure has been made in view of the foregoing, and an object is to provide a selectable one-way clutch that can prevent a reduction of the service lifetime of an engaging piece and can improve the durability.

A selectable one-way clutch (hereinafter referred to as "SOWC") according to embodiments of the present disclosure will be described with reference to the accompanying drawings. Note that the present disclosure is not limited to the embodiments below. Further, note that configuration elements in the embodiments include elements that may be replaceable by a person skilled in the art and elements which are substantially the same as the elements in the embodiments.

First Embodiment

Figure 1B:
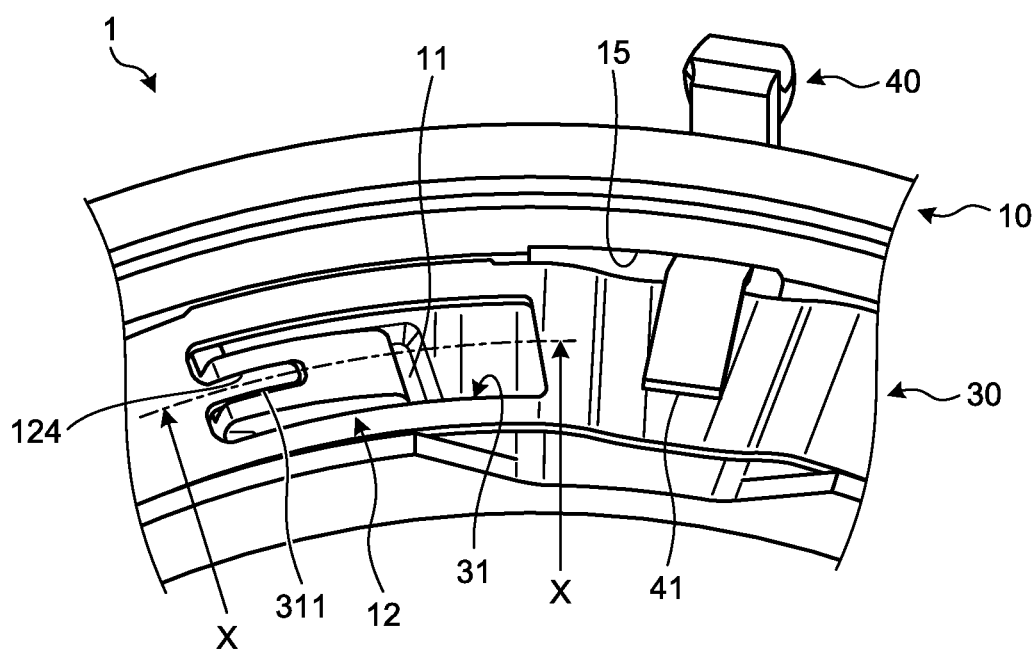
FIG. 1B is a diagram illustrating a configuration of the principal portion of the selectable one-way clutch according to the first embodiment of the present disclosure, and is a perspective view illustrating a state when the selectable one-way clutch is not engaged.

An SOWC 1 according to a first embodiment is mounted on a power transmission device, for example, in a hybrid vehicle and includes a pocket plate 10, a notch plate 20, a selector plate 30, and an arm 40, as illustrated in FIGS. 1A and 1B. Note that FIG. 1A is a sectional view illustrating a state in which the SOWC 1 is cut in an X-X direction (in a center in a width direction of a strut 12) illustrated in FIG. 1B, and FIG. 1B is a perspective view illustrating a state in which the notch plate 20 is removed from the SOWC 1. Further, "rotating direction" illustrated in FIG. 1A refers to a direction (an overrun direction or a non-engaging direction of the SOWC 1) into which the notch plate 20 is rotated in overrun.

The pocket plate 10 is formed into a cylindrical shape. A plurality of pockets (accommodating recessed portions) 11 depressed into a plate thickness direction of the SOWC 1 is formed on one surface of the pocket plate 10, that is, on a surface facing the notch plate 20, of the pocket plate 10. A plate-like strut (engaging piece) 12 is accommodated inside the pocket 11.

The pocket 11 is formed in a position corresponding to a notch 21 of the notch plate 20. Then, an elastic member 14 that energizes the strut 12 to the notch plate 20 side is arranged between a recessed portion 13 (see FIG. 7) formed in the pocket 11 and the strut 12.

The strut 12 switches a state in which one end portion of the strut 12 rises from the pocket plate 10 side to the notch plate 20 side, and a state in which the entire strut 12 including the one end portion is accommodated in the pocket 11, by coaxial rotation of the selector plate 30 with a rotation axis of the notch plate 20. Further, as described below, the strut 12 is engaged with the notch 21 under a predetermined condition, to restrict the rotation of the notch plate 20.

The notch plate 20 is formed into an annular shape (hollow disk shape). Further, the notch plate 20 is arranged to face a surface of the pocket plate 10, in which the pockets 11 are formed, and is relatively rotatable with respect to the pocket plate 10.

A plurality of the notches (engaging recessed portions) 21 depressed in the plate thickness direction is formed on a surface of the notch plate 20, the surface facing the pocket plate 10. The notch 21 is a recessed portion that allows the one end portion of the strut 12 to enter therein, the one end portion of the strut 12 passing through a window hole 31 in the selector plate 30 and rising from the pocket plate 10 side to the notch plate 20 side.

The selector plate 30 is formed into an annular shape (hollow disk shape) and also into a plate shape. Further, the selector plate 30 is positioned between the pocket plate 10 and the notch plate 20. Then, the selector plate 30 switches an engaged state and an non-engaged state, as described below, by being coaxially rotated with the rotation axis of the notch plate 20 around the rotation axis by a predetermined angle. The window hole 31 penetrating the selector plate 30 in the plate thickness direction is formed in a position corresponding to the pocket 11 of the pocket plate 10 and the strut 12.

Here, when the position of the window hole 31 is shifted with respect to the position of the pocket 11 in a peripheral direction of the SOWC 1, the strut 12 is pushed by a lower surface 30b of the selector plate 30 to the pocket 11 side, and is accommodated in the pocket 11, as illustrated in FIGS. 1A and 1B. With this configuration, the SOWC 1 becomes the non-engaged state. In this non-engaged state, the strut 12 is not engaged with the notch (engagement between the strut 12 and the notch 21 is cancelled), and thus torque is not transmitted between the pocket plate 10 and the notch plate 20.

Figure 2A:
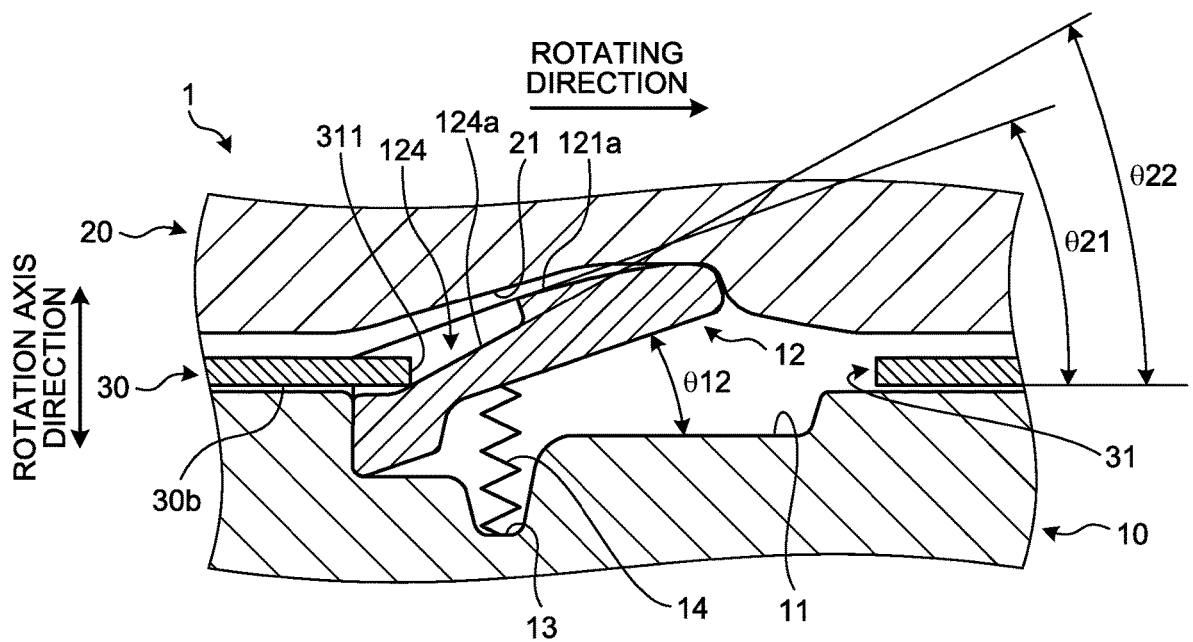
FIG. 2A is a diagram illustrating a configuration of the principal portion of the selectable one-way clutch according to the first embodiment of the present disclosure, and is a sectional view illustrating a state when the selectable one-way clutch is engaged.
Figure 2B:
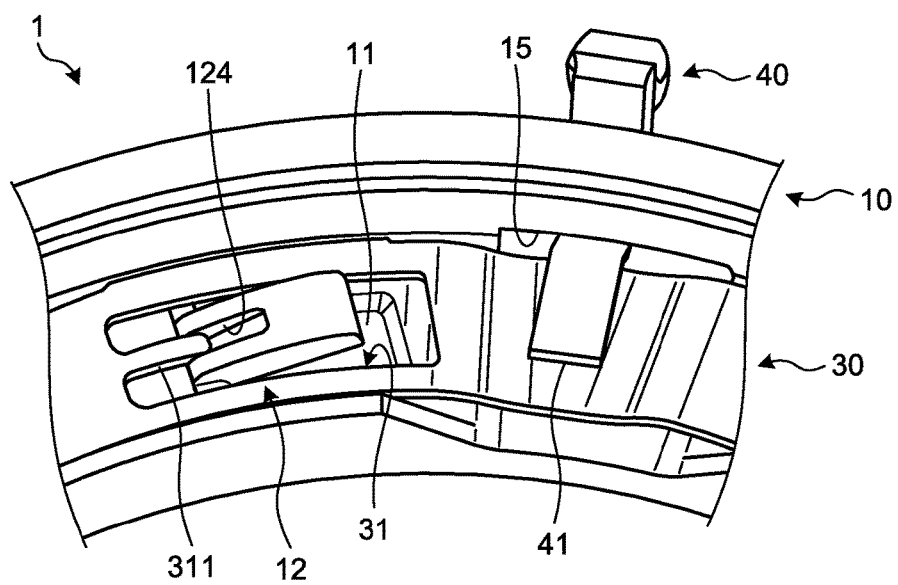
FIG. 2B is a diagram illustrating a configuration of the principal portion of the selectable one-way clutch according to the first embodiment of the present disclosure, and is a perspective view illustrating a state when the selectable one-way clutch is engaged.

Meanwhile, when the position of the window hole 31 and the position of the pocket 11 are roughly matched in the peripheral direction of the SOWC 1, the one end portion of the strut 12 is pushed by the elastic member 14, passes through the window hole 31, and rises from the pocket plate 10 side to the notch plate 20 side, as illustrated in FIGS. 2A and 2B. Then, when the notch plate 20 is rotated in an engaging direction (which is opposite to the "rotating direction" in FIG. 1A) with respect to the pocket plate 10, in a state where the one end portion of the strut 12 rises from the pocket plate 10 side to the notch plate 20 side, in this way, the strut 12 is engaged with the notch 21, and the SOWC 1 becomes the engaged state. In this engaged state, the strut 12 is engaged with the notch 21, and thus torque becomes able to be transmitted between the pocket plate 10 and the notch plate 20.

An arm 40 transmits drive force of an actuator (not illustrated) provided outside to the selector plate 30. The arm 40 has an end portion 41 inserted into a notch portion 15 formed in an outer periphery of the pocket plate 10, and connected with the selector plate 30 inside the pocket plate 10. Further, as illustrated in FIG. 1B, a tip portion of the arm 40 exposed to an outside of the SOWC 1 through the notch portion 15 is connected with the actuator (not illustrated). Then, when the actuator is driven, the selector plate 30 is rotated through the arm 40.

Hereinafter, specific configurations and operations of a strut 52 and a selector plate 70 of a conventional SOWC 101 will be described with reference to FIGS. 14 to 19.

Figure 16:
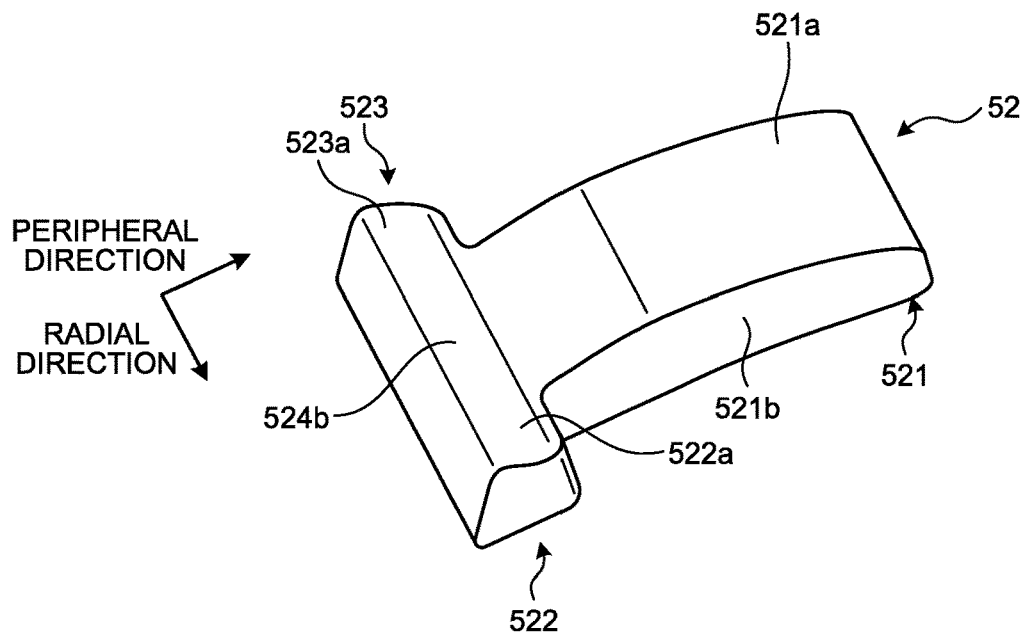
FIG. 16 is a perspective view illustrating a configuration of the strut of the selectable one-way clutch according to the conventional technology.

The conventional strut 52 includes, as illustrated in FIG. 16, a main body portion 521, an inner-ear portion 522, and an outer-ear portion 523. An upper surface 521a of the main body portion 521 is formed on a flat and gentle curved surface. Further, the main body portion 521 includes a plane portion 524b that connects an upper surface 522a of the inner-ear portion 522 and an upper surface 523a of the outer-ear portion 523, between the inner-ear portion 522 and the outer-ear portion 523. In this way, in the strut 52, the upper surface 522a of the inner-ear portion 522, the upper surface 523a of the outer-ear portion 523, and the plane portion 524b form a same plane.

Figure 17:
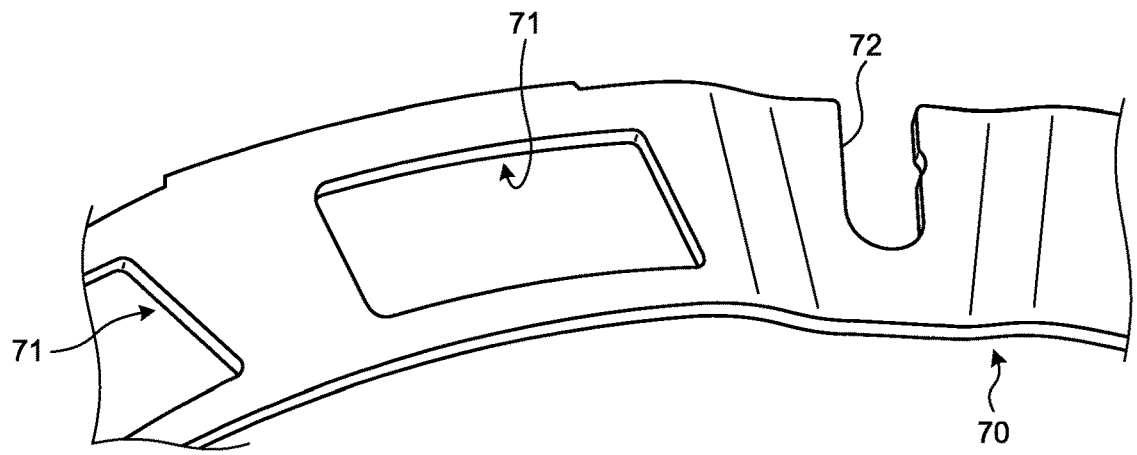
FIG. 17 is a perspective view illustrating a configuration of a selector plate according to the selectable one-way clutch according to the conventional technology.

In the conventional selector plate 70, as illustrated in FIG. 17, a plurality of window holes 71, each of which is formed into a square shape, and a notch portion 72 with which the arm 40 (see FIG. 1B) is connected are formed.

Figure 18:
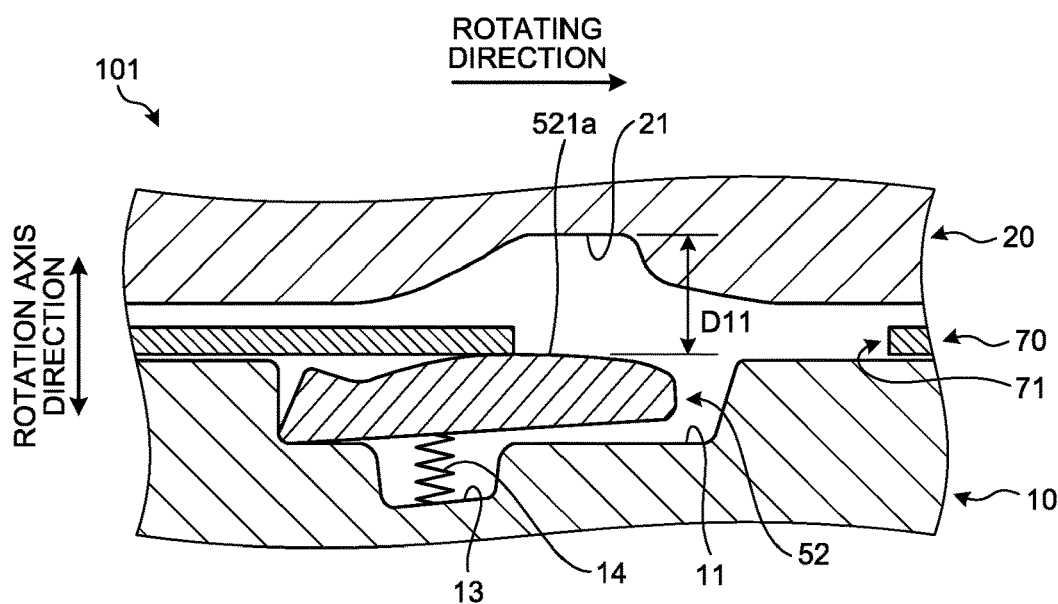
FIG. 18 is a diagram illustrating a configuration of a principal portion of the selectable one-way clutch according to the conventional technology, and illustrating a sectional view in a state when the selectable one-way clutch is not engaged.
Figure 19:
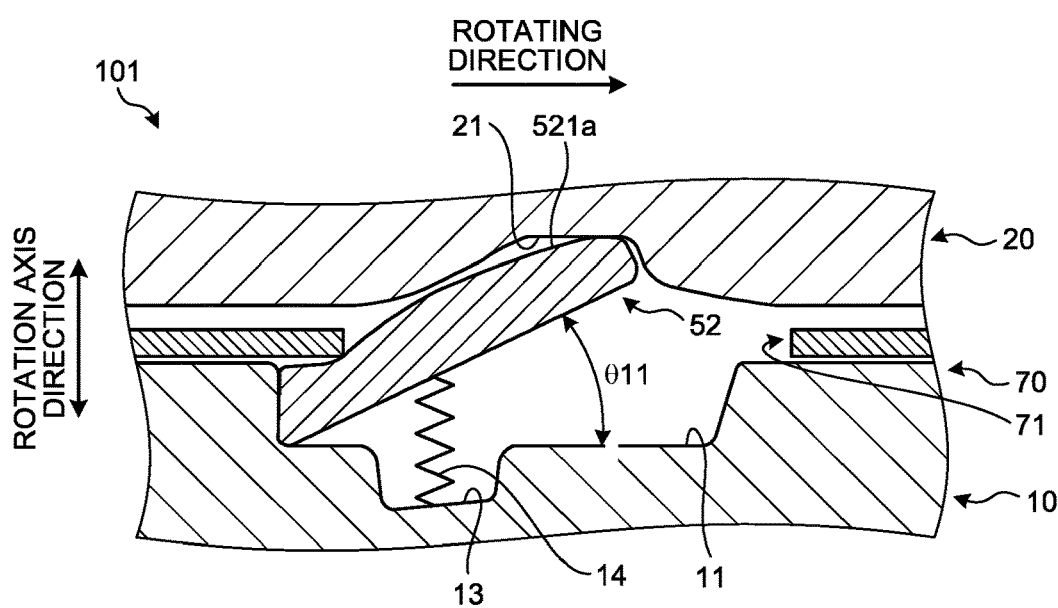
FIG. 19 is a diagram illustrating a configuration of the principal portion of the selectable one-way clutch according to the conventional technology, and illustrating a sectional view in a state when the selectable one-way clutch is engaged.

In the conventional SOWC 101 having such a configuration, when the selector plate 70 is erroneously rotated to an open side due to electrical failure or the like of the actuator (omitted to illustrate) that drives the arm 40, for example, when the notch plate 20 is rotated at a high speed in the overrun direction, as illustrated in FIG. 18, the strut 52 rises to the notch plate 20 by spring force of the elastic member 14, as illustrated in FIG. 19. Then, the strut 52 reciprocates and repeats the collision between the notch plate 20, which is being rotated at a high speed, and the pocket plate 10. As a result, a tensile stress caused by the collision concentrates on a vicinity of root portions between the main body portion 521 (plane portion 524b), and the inner-ear portion 522 and the outer-ear portion 523, where the mechanical strength is smallest in the strut 52, and thus the service lifetime of the strut 52 may be reduced.

Here, as illustrated in FIGS. 18 and 19, in a process where the strut 52 repeats the reciprocating collision between the notch plate 20 and the pocket plate 10, the strut 52 is accelerated by a force which is greater than a restoring force of the elastic member 14, and deeply rises up in the notch 21. As a result, the strut 52 is brought down at a high speed by the notch plate 20, and a yaw moment "My" (see FIG. 14) and translational force "F1" (see FIG. 15) occur in the strut 52. Therefore, one or both of the inner-ear portion 522 and the outer-ear portion 523 collide with an inner surface 11a of the pocket 11 at a high speed.

A reason why the strut 52 is brought down to the pocket plate 10 at a high speed by the notch plate 20 side is that a rising angle θ11 of the strut 52 is large and thus a speed to bring the strut 52 down (hereinafter, the speed is referred to as "bring-down speed") by the notch plate 20, which is being rotated at a high speed, becomes large in the conventional SOWC 101, as illustrated in FIG. 19.

Figure 14:
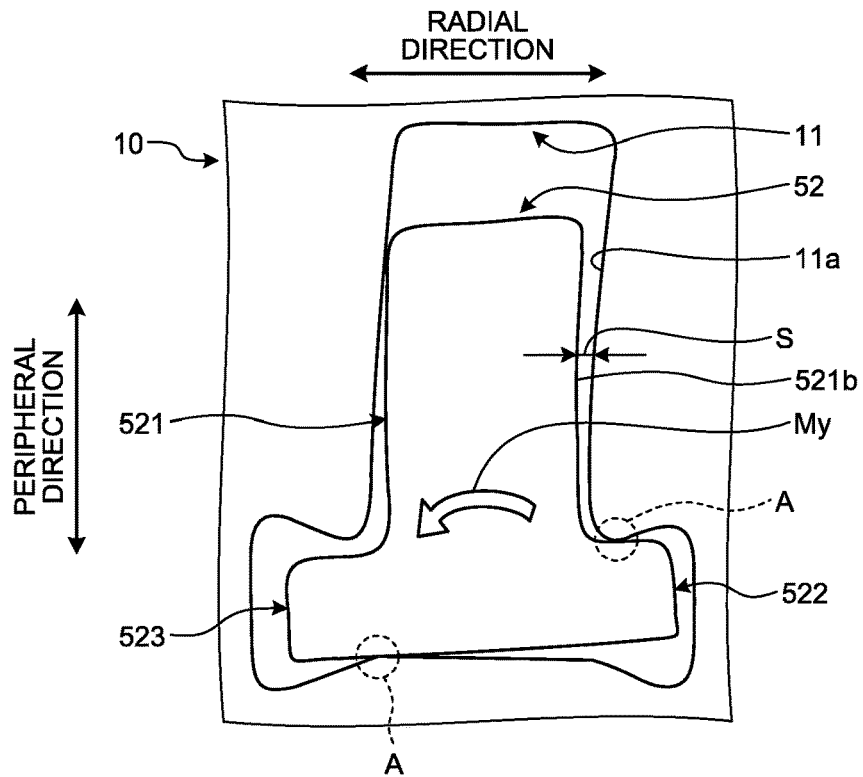
FIG. 14 is a plan view for describing a yaw moment occurring in a strut in overrun in a selectable one-way clutch according to a conventional technology.
Figure 15:
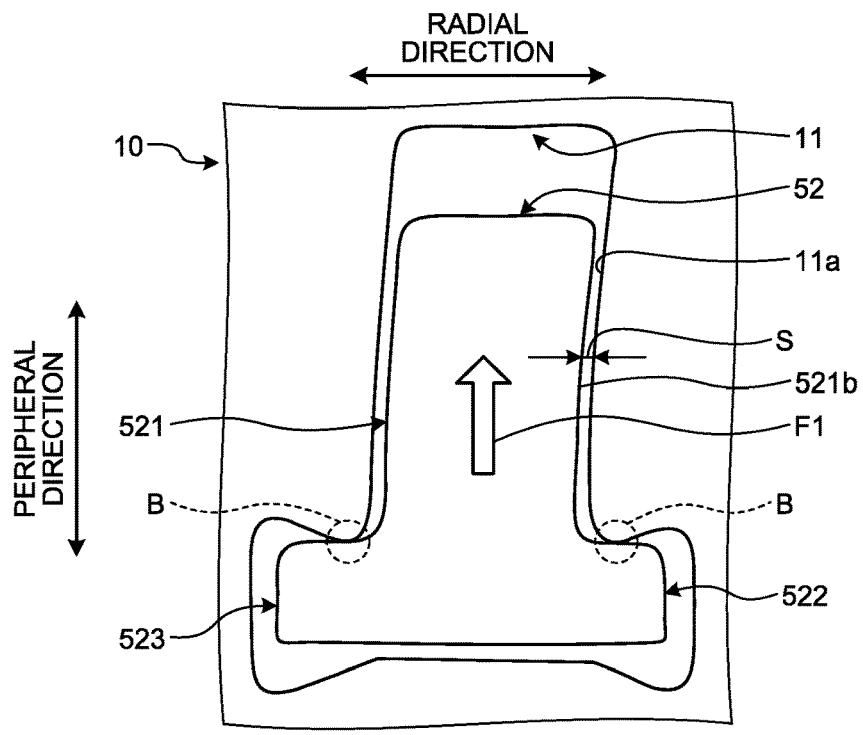
FIG. 15 is a plan view for describing a translational force occurring in the strut in overrun in the selectable one-way clutch according to the conventional technology.

Further, reasons of occurrence of the yaw moment "My" and the translational force "F1" in the strut 52 are that a gap "S" between the inner surface 11a of the pocket 11, the inner surface 11a determining a posture of the strut 52, and a side surface 521b of the main body portion 521 of the strut 52 is set to be large for a manufacturing reason, in the conventional SOWC 101, as illustrated in FIGS. 14 and 15, in addition to the large rising angle θ11 of the strut 52, and thus movement of the strut 52 in a yaw direction cannot be sufficiently suppressed.

Therefore, in the SOWC 1 according to the present embodiment, the phenomenon that the strut 12 is brought down at a high speed by the notch plate 20 and the phenomenon of occurrence of the yaw moment "My" and the translational force "F1" are suppressed by changing shapes of the strut 12 and the selector plate 30. In the following, specific configurations of the strut 12 and the selector plate 30 of the SOWC 1 will be described with reference to FIGS. 3 and 4.

Figure 3:
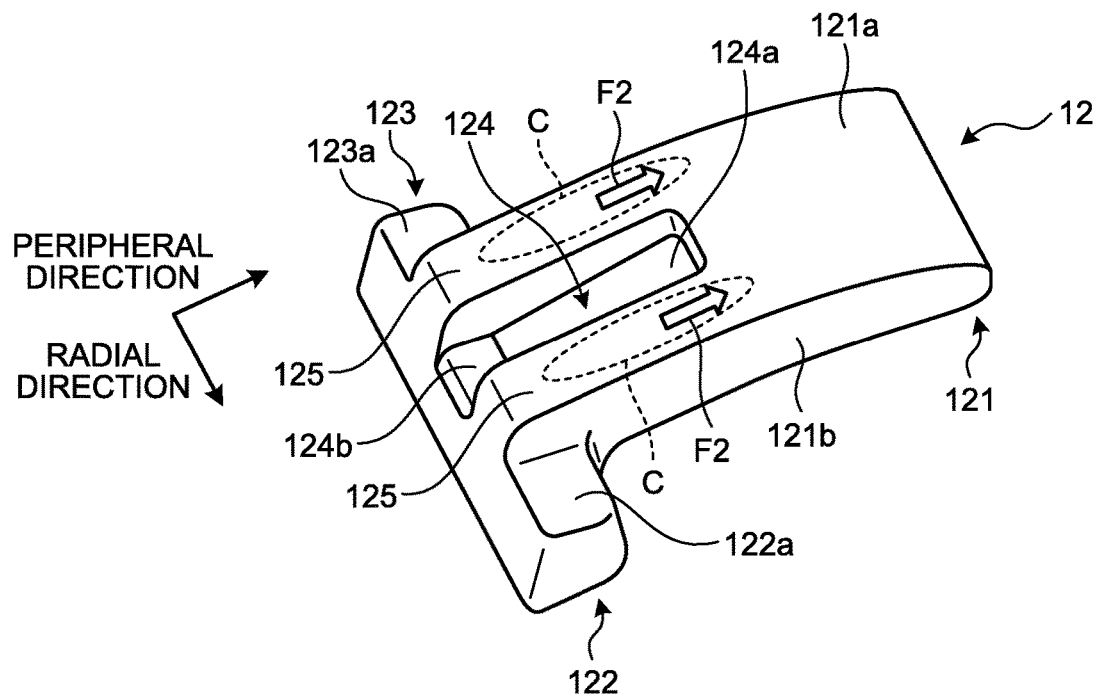
FIG. 3 is a perspective view illustrating a configuration of a strut of the selectable one-way clutch according to the first embodiment of the present disclosure.

The strut 12 includes, as illustrated in FIG. 3, a main body portion 121 extending along the peripheral direction of the pocket plate 10, and an inner-ear portion 122 and an outer-ear portion 123 extending to the sides opposite to each other in a radial direction of the SOWC 1 from an end portion of the main body portion 121 (an end portion in the peripheral direction of the SOWC 1). Note that the inner-ear portion 122 and the outer-ear portion 123 function as a rotation axis when the strut 12 rises.

An upper surface 121a of the main body portion 121 is formed on a gentle curved surface. Further, a groove portion 124 having a predetermined depth is formed on the upper surface 121a of the main body portion 121 along the peripheral direction of the SOWC 1. Further, the main body portion 121 includes, on both sides of the groove portion 124, a pair of contact portions 125 that comes in contact with the notch plate 20 when the strut 12 passes through the window hole 31 of the selector plate 30 and rises from the pocket plate 10 side to the notch plate 20 side. The contact portions 125 are formed up to an end portion of the main body portion 121. Note that the "end portion of the main body portion 121" refers to an end portion of the main body portion 121 in an extending direction and an end portion on the side of the inner-ear portion 122 and the outer-ear portion 123 in the peripheral direction of the SOWC 1.

The groove portion 124 is formed in a center in a width direction of the upper surface 121a of the main body portion 121, and in a center in the radial direction of the SOWC 1, in the main body portion 121. Further, the groove portion 124 is formed from a position in a center in a length direction of the upper surface 121a of the main body portion 121 to the end portion of the main body portion 121. Further, a bottom surface of the groove portion 124 includes a slope portion 124a inclined with respect to an upper surface 122a of the inner-ear portion 122 and an upper surface 123a of the outer-ear portion 123, and a plane portion 124b parallel to the upper surfaces 122a and 123a. Further, in the strut 12, the inner-ear portion 122, the outer-ear portion 123, the contact portions 125, and the plane portion 124b of the groove portion 124 are positioned side by side in the radial direction of the SOWC 1.

Figure 4:
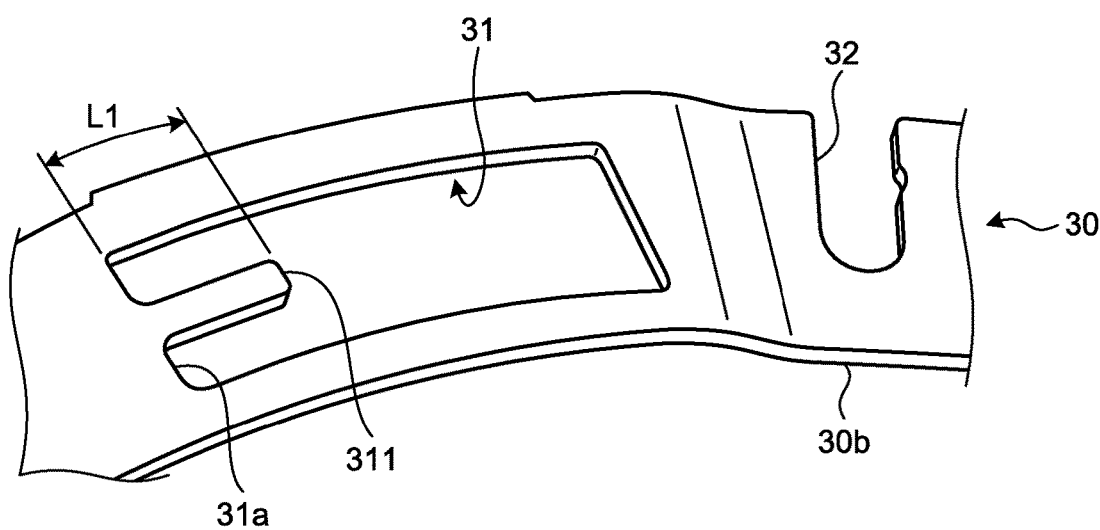
FIG. 4 is a perspective view illustrating a configuration of a selector plate of the selectable one-way clutch according to the first embodiment of the present disclosure.

In the selector plate 30, as illustrated in FIG. 4, a plurality of the window holes 31, each of which is formed into a square shape, and a notch portion 32 with which the arm 40 (see FIG. 1B) is connected. Further, the selector plate 30 includes a protruding portion 311 that protrudes from an inner surface 31a of the window hole 31 along a forming direction of the groove portion 124 of the strut 12, that is, along the peripheral direction of the SOWC 1. The protruding portion 311 is formed in a protrusion shape to have roughly the same length as the length of the groove portion 124 of the strut 12 (the length of a total of the slope portion 124a and the plane portion 124b).

In the SOWC 1 including the strut 12 and the selector plate 30 having such shapes, as illustrated in FIGS. 1A and 1B, the protruding portion 311 of the selector plate 30 is slid and moved with respect to the groove portion 124 of the strut 12, and the protruding portion 311 is fit into the groove portion 124, when the SOWC 1 is not engaged (when the selector plate 30 is closed). Then, as illustrated in FIG. 1A, the strut 12 and the selector plate 30 are layered in a rotation axis direction of the SOWC 1. Note that the "the strut 12 and the selector plate 30 are layered in a rotation axis direction of the SOWC 1" means, to be specific, as illustrated in FIG. 1A, a state in which at least the lower surface 30b of the selector plate 30 is positioned at a lower side in the rotation axis direction than the upper surface 121a of the main body portion 121 of the strut 12, favorably, a state in which the upper surface 121a of the main body portion 121 of the strut 12 and the upper surface 30a of the selector plate 30 are positioned at nearly the same height.

With this configuration, as illustrated in FIG. 1A, a distance between the strut 12 and the notch plate 20, that is, when the SOWC 1 is not engaged (when the selector plate 30 is closed), a distance D12 between the upper surface 121a of the main body portion 121 of the strut 12 and a bottom surface of the notch 21 becomes smaller than the distance D11 (see FIG. 18) in the conventional SOWC 101. Then, as illustrated in FIG. 2A, a rising angle θ12 of the strut 12 in overrun becomes smaller than the rising angle θ11 (see FIG. 19) in the conventional SOWC 101. Therefore, according to the SOWC 1 of the present embodiment, the bring-down speed of the strut 12 in overrun is decreased as compared with the conventional case, and an impact force when the strut 12 performs a reciprocating collision between the notch plate 20 and the pocket plate 10 is reduced.

Further, in the SOWC 1, the rising angle θ12 of the strut 12 is restricted by bringing the protruding portion 311 of the selector plate 30 to be fit into the groove portion 124, and thus it is C portions in FIG. 3, that is, the contact portions 125 on both sides of the groove portion 124 that come in contact with the notch plate 20 in overrun. Therefore, a downward force from the notch plate 20 acts on the strut 12, and a frictional force "F2" from the notch plate 20 occurs in the pair of contact portions 125 at the collision with the notch plate 20. Therefore, the SOWC 1 includes the pair of contact portions 125, and thus the frictional force "F2" acts on both sides of the groove portion 124 at the collision with the notch plate 20 and uniformly acts in the width direction of the strut 12. Therefore, the SOWC 1 can prevent an occurrence of roll motion in the strut 12.

Figure 5:
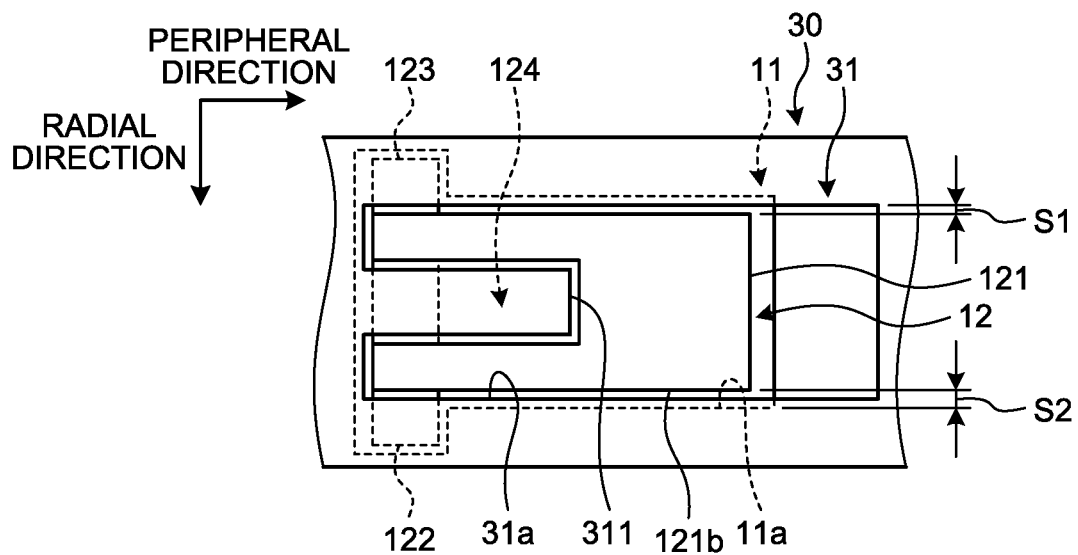
FIG. 5 is a plan view illustrating a relationship between a gap between a side surface of the strut and an inner surface of a window hole, and a gap between the side surface of the strut and a side surface of a pocket when the selectable one-way clutch according to the first embodiment of the present disclosure is not engaged.
Figure 6:
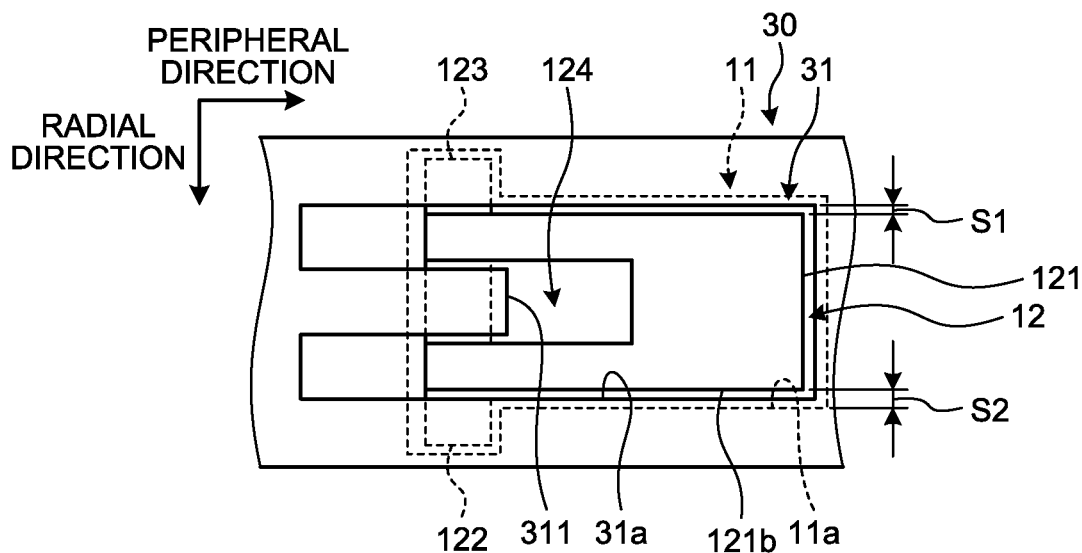
FIG. 6 is a plan view illustrating a relationship between the gap between a side surface of the strut and an inner surface of a window hole, and the gap between the side surface of the strut and a side surface of a pocket when the selectable one-way clutch according to the first embodiment of the present disclosure is engaged.

Here, in the SOWC 1, as illustrated in FIGS. 5 and 6, it is preferable to set a gap "S1" between a side surface 121b of the main body portion 121 of the strut 12 and the inner surface 31a of the window hole 31 of the selector plate 30 to be smaller than a gap "S2" between the side surface 121b of the main body portion 121 of the strut 12 and the inner surface 11a of the pocket 11, in the radial direction of the SOWC 1.

With this configuration, the amount of motion of the strut 12 in the yaw direction can be decreased, and the movement of the strut 12 in the yaw direction can be sufficiently prevented. Therefore, the yaw moment "My" and the translational force "F1" can be further decreased, and the impact force when one or both of the inner-ear portion 122 and the outer-ear portion 123 of the strut 12 collide with the inner surface 11a of the pocket 11 can be further reduced.

Note that causing the gap "S1" and the gap "S2" to have the relationship (the gap "S1"<the gap "S2") as illustrated in FIGS. 5 and 6 can be realized under the structure of the SOWC 1 according to the present embodiment, and cannot be realized under the structure of the SOWC 101 according to the conventional technology.

For example, in the SOWC 1 according to the present embodiment, as illustrated in FIG. 1A, the strut 12 and the selector plate 30 are in a state of being layered in the rotation axis direction of the SOWC 1 when the selector plate 30 is closed (when the SOWC 1 is not engaged). Further, the protruding portion 311 of the selector plate 30 is fit into the groove portion 124 of the strut 12, and thus the position of the strut 12 in the pocket 11 and the movement in the yaw direction are restricted. Therefore, the strut 12 rises right above when the selector plate 30 is open. Therefore, even if the gap "S1" between the strut 12 and the window hole 31 is made smaller than the gap "S2" between the strut 12 and the pocket 11, the strut 12 can normally rise without getting caught on the window hole 31.

On the other hand, in the SOWC 101 according to the conventional technology, as illustrated in FIG. 18, the strut 52 and the selector plate 70 are not layered in the rotation axis direction of the SOWC 101 when the selector plate 70 is closed (when the SOWC 101 is not engaged). Further, the position of the strut 52 in the pocket 11 and the movement in the yaw direction are not especially restricted, and thus the strut 52 may not rise right above when the selector plate 70 is open. Therefore, if a gap between the strut 52 and the window hole 71 is made smaller than a gap between the strut 52 and the pocket 11, the strut 52 may get caught on the window hole 71 and may not normally rise.

Here, in the SOWC 1, as illustrated in FIG. 2A, it is preferable to set an angle "θ22" of the slope portion 124a of the groove portion 124 with respect to the lower surface 30b of the selector plate 30 to be larger than an angle "θ21" of the upper surface 121a of the main body portion 121 of the strut 12 with respect to the lower surface 30b of the selector plate 30, in the state in which the strut 12 passes through the window hole 31, and rises from the pocket plate 10 side to the notch plate 20 side, in overrun.

Figure 7:
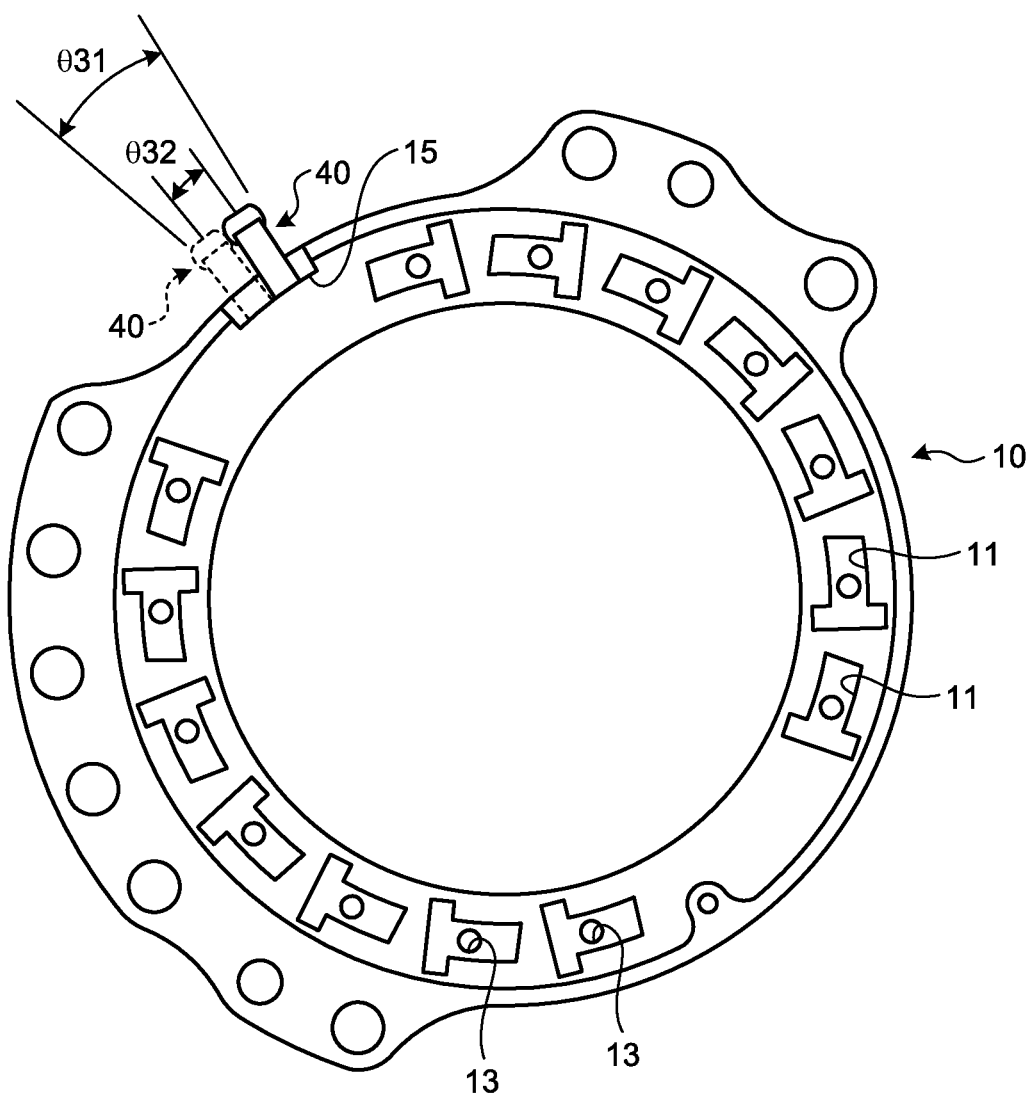
FIG. 7 is a plan view for describing a difference in an operation angle of the selector plate between in the selectable one-way clutch according to the first embodiment of the present disclosure and that in a conventional case.

With this configuration, a contact angle of the selector plate 30 (to be specific, a lower surface of the protruding portion 311) with respect to the strut 12 (to be specific, the slope portion 124a) when the selector plate 30 is closed becomes smaller than the conventional SOWC 101 (see FIG. 19) provided with the strut 52 without the groove portion 124, and the strut 12 can be accommodated into the pocket 11 with a shorter stroke than the conventional case. Therefore, as illustrated in FIG. 7, a drive angle θ32 of the arm 40 that operates the selector plate 30 can be made smaller than a drive angle θ31 in the conventional SOWC 101. Therefore, a stroke amount of the actuator (not illustrated) that operates the arm 40 to rotate the selector plate 30 can be made short, and downsizing and cost reduction of the actuator can be achieved.

According to the SOWC 1 of the first embodiment as described above, the impact force when the strut 12 performs the reciprocating collision between the notch plate 20 and the pocket plate 10 in overrun can be reduced, and the occurrence of the yaw moment "My" and the translational force "F1" can be suppressed. Therefore, a decrease in the service lifetime of the strut 12 is prevented, and the durability can be improved.

Further, according to the SOWC 1, the inner-ear portion 122, the outer-ear portion 123, the pair of contact portions 125, and the plane portion 124b are arranged side by side in the radial direction of the SOWC 1, that is, the pair of contact portions 125 is provided up to the end portion of the main body portion 121. Therefore, the mechanical strength near root portions between the main body portion 121, and the inner-ear portion 122 and the outer-ear portion 123 can be improved.

Second Embodiment

Figure 8:
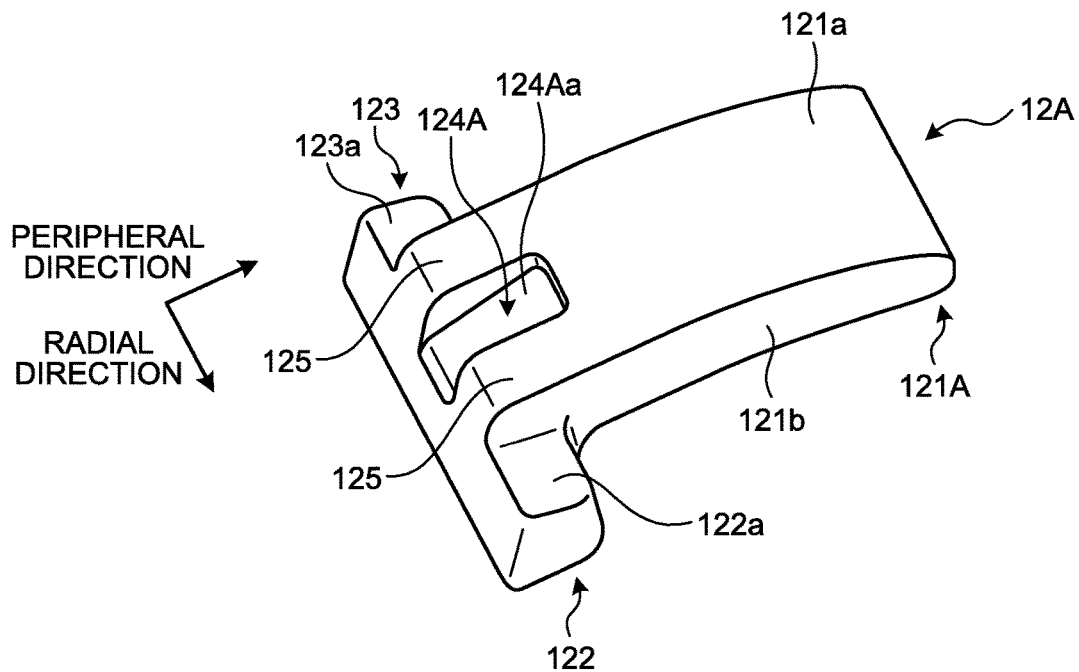
FIG. 8 is a perspective view illustrating a configuration of a strut of a selectable one-way clutch according to a second embodiment of the present disclosure.
Figure 9:
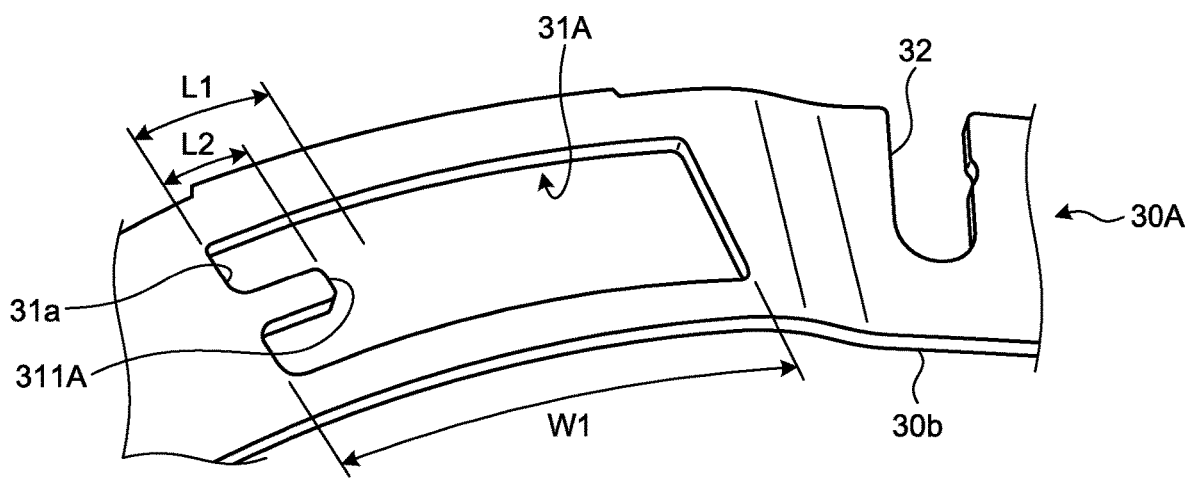
FIG. 9 is a perspective view illustrating a configuration of a selector plate of the selectable one-way clutch according to the second embodiment of the present disclosure.

An SOWC according to a second embodiment will be described with reference to FIGS. 8 and 9. A configuration of the SOWC according to the present embodiment is similar to that of the first embodiment except that the configuration includes a strut 12A as illustrated in FIG. 8 and a selector plate 30A as illustrated in FIG. 9.

The strut 12A is obtained such that the slope portion 124a in the strut 12 of the first embodiment is extended up to the end portion of the main body portion 121. The strut 12A includes, as illustrated in FIG. 8, a main body portion 121A, an inner-ear portion 122, and an outer-ear portion 123. A groove portion 124A having a predetermined depth is formed on an upper surface 121a of the main body portion 121A along a peripheral direction of the SOWC. Further, a pair of contact portions 125 is provided on both sides of the groove portion 124A.

The groove portion 124A is formed in a center in a width direction of the upper surface 121a of the main body portion 121A. Further, the groove portion 124A is formed from a position closer to an end portion of the main body portion 121A than a center in a length direction of the upper surface 121a of the main body portion 121A is, to the end portion of the main body portion 121A. Further, a bottom surface of the groove portion 124A is formed from a slope portion 124Aa inclined with respect to an upper surface 122a of the inner-ear portion 122 and an upper surface 123a of the outer-ear portion 123. That is, the bottom surface of the groove portion 124A according to the present embodiment does not include the plane portion 124b (see FIG. 3) in the first embodiment.

The length of the groove portion 124A (the length in the peripheral direction of the SOWC) is formed shorter than the length of the groove portion 124 of the strut 12 of the first embodiment. Further, similar to the pair of contact portions 125, the groove portion 124A is formed up to the position of the end portion of the main body portion 121A. In the strut 12A having such a configuration, the inner-ear portion 122, the outer-ear portion 123, the contact portions 125, and the slope portion 124Aa of the groove portion 124A are positioned side by side in a radial direction of the SOWC.

In the selector plate 30A, as illustrated in FIG. 9, a plurality of window holes 31A, each of which is formed into a square shape, and a notch portion 32 with which an arm 40 (see FIG. 1B) is connected are formed. Further, the selector plate 30A includes a protruding portion 311A protruding from an inner surface 31a of the window hole 31A in a forming direction of the groove portion 124A of the strut 12A. A length L2 of the protruding portion 311A (a length in the peripheral direction of the SOWC) is formed shorter than a length "L1" of the protruding portion 311 (see FIG. 4) of the selector plate 30 of the first embodiment.

According to the SOWC of the second embodiment as described above, the inner-ear portion 122, the outer-ear portion 123, the contact portions 125, and the groove portion 124A are arranged side by side in the radial direction of the SOWC, and thus the protruding portion 311A of the selector plate 30A can be made short. Therefore, the rigidity and the durability of the protruding portion 311A can be improved. Further, the protruding portion 311A is made short, and thus a stroke amount of an actuator (not illustrated) that operates the arm 40 (see FIG. 7) to rotate the selector plate 30A can be made short, and downsizing and cost reduction of the actuator can be achieved.

Further, according to the SOWC of the second embodiment, the entire bottom surface of the groove portion 124A is formed from the slope portion 124Aa, and thus the thickness of the end portion of the groove portion 124A can be made greater than that in the first embodiment (see FIG. 3) in which a part of the bottom surface of the groove portion 124 is formed from the plane portion 124b. Therefore, the rigidity and the durability of the strut 12A can be improved.

Further, according to the SOWC of the second embodiment, the pair of contact portions 125 is provided up to the end portion of the main body portion 121A, similar to the first embodiment, and thus the mechanical strength near root portions between the main body portion 121A, and the inner-ear portion 122 and the outer-ear portion 123 can be improved.

Third Embodiment

An SOWC according to a third embodiment will be described with reference to FIGS. 10 and 11. A configuration of the SOWC according to the present embodiment is similar to that of the first embodiment except that the configuration includes a strut 12B as illustrated in FIG. 10 and a selector plate 30B as illustrated in FIG. 11.

Figure 10:
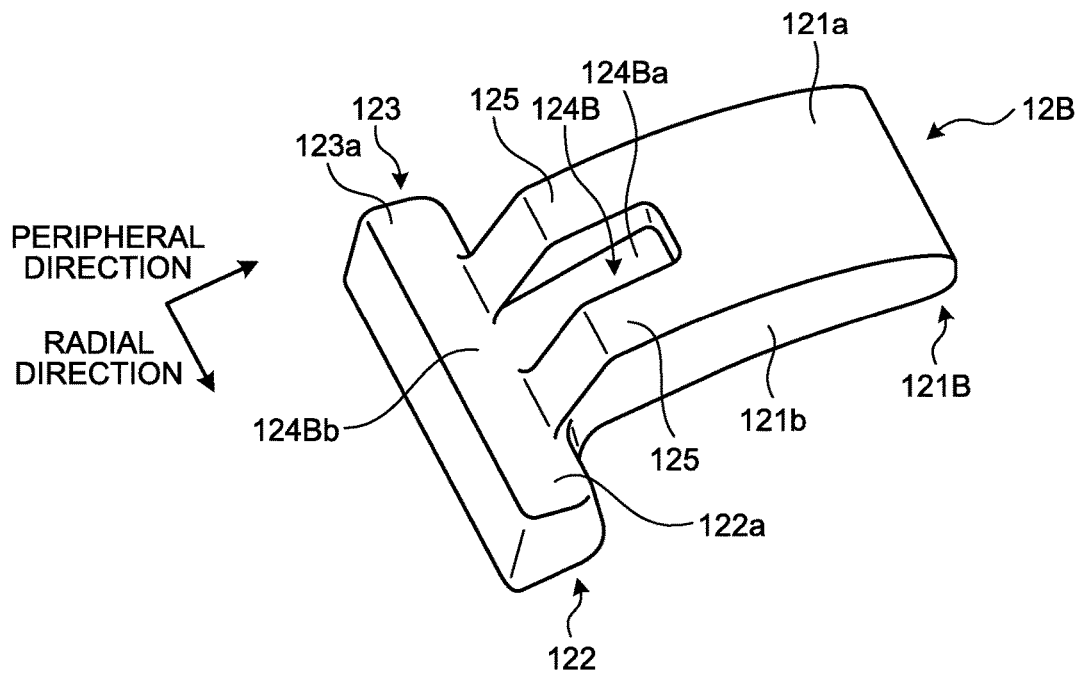
FIG. 10 is a perspective view illustrating a configuration of a strut of a selectable one-way clutch according to a third embodiment of the present disclosure.
Figure 11:
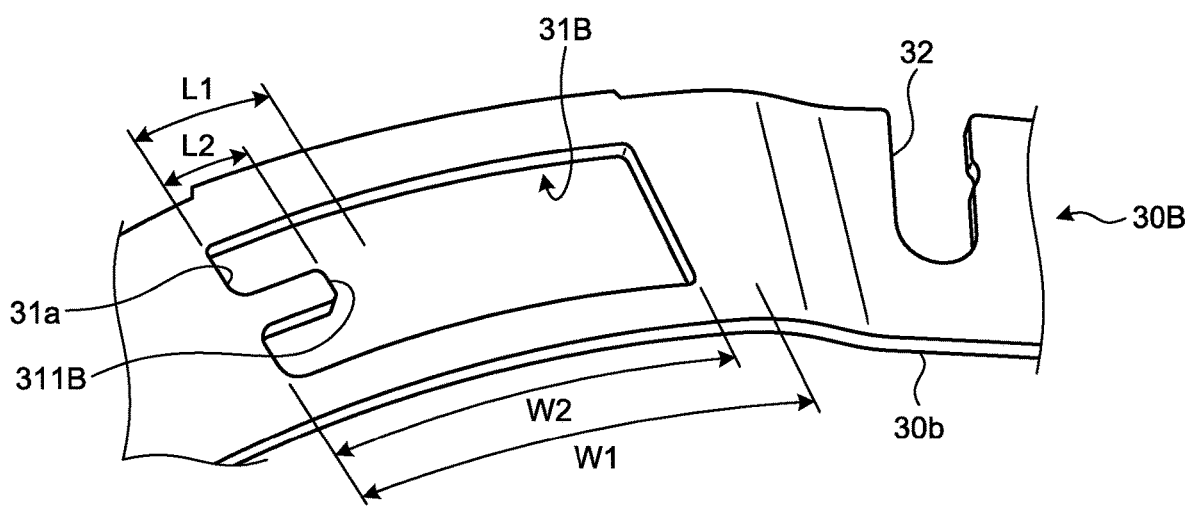
FIG. 11 is a perspective view illustrating a configuration of a selector plate of the selectable one-way clutch according to the third embodiment of the present disclosure.

The strut 12B includes, as illustrated in FIG. 10, a main body portion 121B, an inner-ear portion 122, and an outer-ear portion 123. A groove portion 124B having a predetermined depth is formed on an upper surface 121a of the main body portion 121B along a peripheral direction of the SOWC. Further, the main body portion 121B includes, between the inner-ear portion 122 and the outer-ear portion 123, a plane portion 124Bb that connects an upper surface 122a of the inner-ear portion 122 and an upper surface 123a of the outer-ear portion 123. In this way, in the strut 12B, the upper surface 122a of the inner-ear portion 122, the upper surface 123a of the outer-ear portion 123, and the plane portion 124Bb form the same plane. Further, a pair of contact portions 125 is provided on both sides of the groove portion 124B.

The groove portion 124B is formed in a center in a width direction of the upper surface 121a of the main body portion 121B. Further, the groove portion 124B is formed from a position in a center in a length direction of the upper surface 121a of the main body portion 121B to the plane portion 124Bb of the main body portion 121B. Further, a bottom surface of the groove portion 124B is configured from a slope portion 124Ba inclined with respect to the upper surface 122a of the inner-ear portion 122 and the upper surface 123a of the outer-ear portion 123. That is, the bottom surface of the groove portion 124B according to the present embodiment does not include the plane portion 124b (see FIG. 3) in the first embodiment.

The length of the groove portion 124B (the length in the peripheral direction of the SOWC) is formed shorter than the length of the groove portion 124 of the strut 12 of the first embodiment. In the strut 12B having such a configuration, the contact portions 125 and the slope portion 124Ba of the groove portion 124B are positioned side by side in a radial direction of the SOWC, and the inner-ear portion 122, the outer-ear portion 123, and the plane portion 124Bb are positioned side by side in the radial direction of the SOWC.

In the selector plate 30B, as illustrated in FIG. 11, a plurality of window holes 31B, each of which is formed in a square, and a notch portion 32 with which an arm 40 (see FIG. 1B) is connected are formed. Further, the selector plate 30B includes a protruding portion 311B protruding from an inner surface 31a of the window hole 31B in a forming direction of the groove portion 124B of the strut 12B. A length L2 of the protruding portion 311B (a length in the peripheral direction of the SOWC) is similarly formed to the length L2 of the protruding portion 311A (see FIG. 9) of the selector plate 30A of the second embodiment. Further, a width W2 of the window hole 31B (a length in the peripheral direction of the SOWC) is formed shorter than a width W1 of the window hole 31A (see FIG. 9) of the selector plate 30A of the second embodiment. That is, the area of the window hole 31B of the present embodiment is formed smaller than the area of the window hole 31A of the second embodiment.

The SOWC according to the third embodiment as described above, the inner-ear portion 122, the outer-ear portion 123, and the plane portion 124Bb are arranged side by side in the radial direction of the SOWC, and thus the protruding portion 311B of the selector plate 30B can be made short. Therefore, the rigidity and the durability of the protruding portion 311B can be improved. Further, the protruding portion 311B is made short, and thus a stroke amount of an actuator (not illustrated) that operates the arm 40 (see FIG. 7) to rotate the selector plate 30B can be made short, and downsizing and cost reduction of the actuator can be achieved. Further, the area of the window hole 31B of the selector plate 30B can be made small, and thus the rigidity and the durability of the selector plate 30B can be further improved.

Further, in the SOWC according to the third embodiment, only the plane portion 124Bb is provided without providing the contact portions 125 between the inner-ear portion 122 and the outer-ear portion 123, and thus the volume of the strut 12B can be decreased, and the weight of the strut 12B can be reduced. Therefore, the amount of motion of the strut 12B in overrun can be further decreased, and impact force when the strut 12B performs a reciprocating collision between the notch plate 20 and the pocket plate 10 can be further reduced.

Fourth Embodiment

Figure 12:
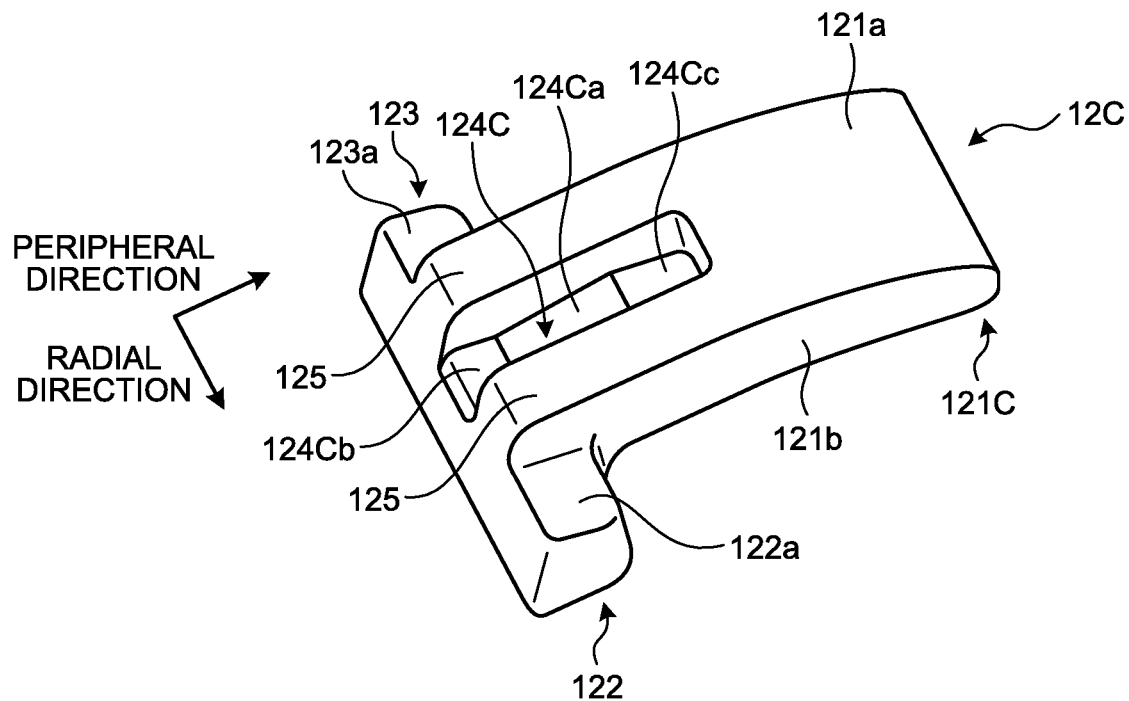
FIG. 12 is a perspective view illustrating a configuration of a strut of a selectable one-way clutch according to a fourth embodiment of the present disclosure.

An SOWC 1C according to a fourth embodiment will be described with reference to FIGS. 12 and 13. A configuration of the SOWC 1C according to the present embodiment is similar to that of the first embodiment except that the configuration includes a strut 12C as illustrated in FIG. 12.

The strut 12C is obtained such that a part of the groove portion 124 in the strut 12 of the first embodiment is formed in a plane manner. The strut 12C includes, as illustrated in FIG. 12, a main body portion 121C, an inner-ear portion 122, and an outer-ear portion 123. A groove portion 124C having a predetermined depth is formed on an upper surface 121a of the main body portion 121C along a peripheral direction of the SOWC 1C. Further, a pair of contact portions 125 is provided on both sides of the groove portion 124C.

The groove portion 124C is formed in a center in a width direction of the upper surface 121a of the main body portion 121C. Further, the groove portion 124C is formed from a position in a center in a length direction of the upper surface 121a of the main body portion 121C to an end portion of the main body portion 121C. Further, a bottom surface of the groove portion 124C is formed from a slope portion 124Ca inclined with respect to an upper surface 122a of the inner-ear portion 122 and an upper surface 123a of the outer-ear portion 123, a plane contact portion 124Cb parallel to the upper surfaces 122a and 123a, and a plane contact portion 124Cc.

The plane contact portion 124Cc is provided in a position of a top of the slope portion 124Ca. Further, to be specific, as illustrated in FIG. 12, the plane contact portion 124Cc is provided in a position where a protruding portion 311 of a selector plate 30 comes in contact when the selector plate 30 is closed (when the SOWC 1C is not engaged), on the bottom surface of the groove portion 124C, that is, a position where the protruding portion 311 comes in contact when the selector plate 30 is moved with a full stroke, on the bottom surface of the groove portion 124C.

Further, the plane contact portion 124Cc is formed to become parallel to a lower surface 30b of the selector plate 30 when the selector plate 30 is closed. In the strut 12C having such a configuration, the inner-ear portion 122, the outer-ear portion 123, the contact portions 125, and the plane contact portion 124Cb of the groove portion 124C are positioned side by side in a radial direction of the SOWC 1C.

Figure 13:
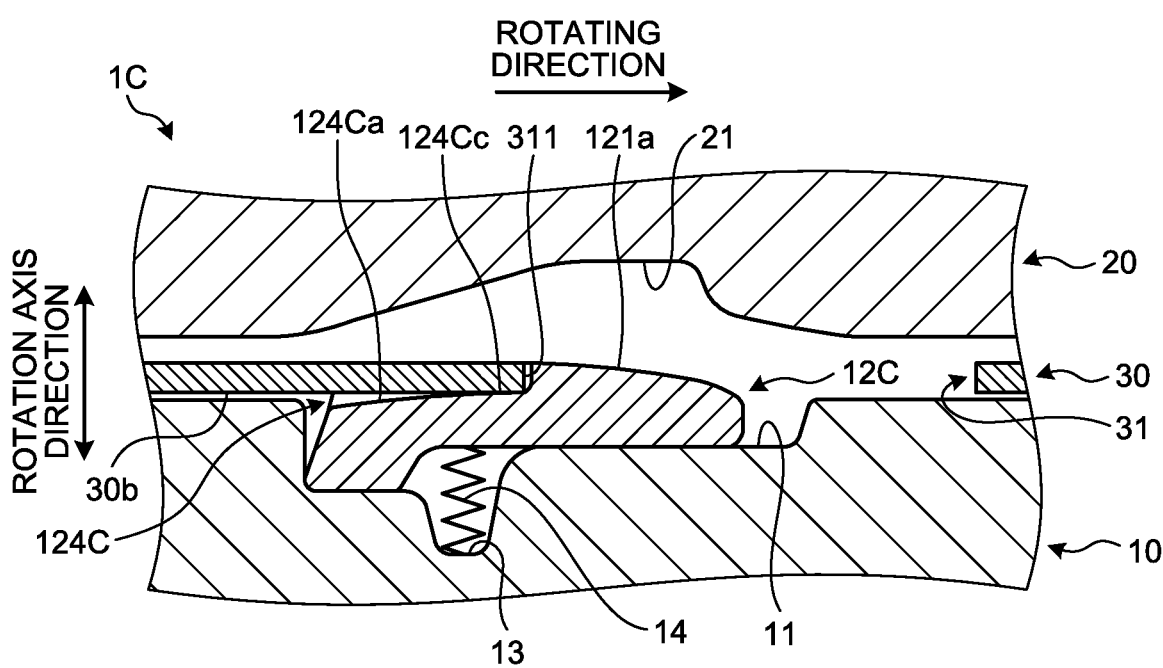
FIG. 13 is a perspective view illustrating a state when the selectable one-way clutch is not engaged in the selectable one-way clutch according to the fourth embodiment of the present disclosure.

According to the SOWC 1C of the fourth embodiment as described above, in a state where the selector plate 30 is closed and the strut 12C is accommodated in a pocket 11, as illustrated in FIG. 13, the lower surface 30b of the selector plate 30 and the plane contact portion 124Cc of the strut 12C are in surface contact, and a spring force of an elastic member 14 that raises the strut 12C works nearly vertical to the lower surface 30b of the selector plate 30. Therefore, the selector plate 30 can resist the spring force of the elastic member 14 without an external force.

Note that the "external force" refers to a force acting on the selector plate 30 through an arm 40 (see FIG. 7) from an actuator (not illustrated), and a force for holding the selector plate 30 in a closed state, as illustrated in FIG. 13. In this way, according to the SOWC 1C of the present embodiment, a driving force of the actuator (not illustrated) can be made small, and downsizing and cost reduction of the actuator can be achieved.

Further, according to the SOWC 1C, the pair of contact portions 125 is provided up to the end portion of the main body portion 121C, similar to the first embodiment, and thus the mechanical strength near root portions between the main body portion 121C, and the inner-ear portion 122 and the outer-ear portion 123 can be improved.

As described above, the selectable one-way clutch according to the present disclosure has been specifically described by the forms for carrying out the disclosure. However, the scope of the present disclosure is not limited to the description, and should be broadly construed on the basis of the description of claims. In addition, it goes without saying that various changes and alternations based on the description are also included in the scope of the present disclosure.

For example, in the SOWC according to the second, third, or fourth embodiment, it is preferable to set a gap between the side surface 121b of the main body portion 121A, 121B, or 121C of the strut and the inner surface 31a of the window hole 31, 31A, or 31B of the selector plate 30, 30A, or 30B to be smaller than a gap between the side surface 121b of the main body portion 121A, 121B, or 121C of the strut 12A, 12B, or 12C and the inner surface 11a of the pocket 11, in the radial direction of the SOWC, similar to the SOWC 1 according to the first embodiment. With this configuration, the yaw moment "My" and the translational force "F1" occurring in the struts 12A to 12C can be further decreased, and the impact force when one or both of the inner-ear portion 122 and the outer-ear portion 123 of the strut 12A, 12B, or 12C collide with the inner surface 11a of the pocket 11 can be further reduced.

Further, in the SOWC according to the second, third, or fourth embodiment, it is preferable to set the angle of the slope portion 124Aa, 124Ba, or 124Ca of the groove portion 124A, 124B, or 124C with respect to the lower surface 30b of the selector plate 30, 30A, or 30B to be larger than the angle of the upper surface 121a of the main body portion 121A, 121B, or 121C of the strut 12A, 12B, or 12C with respect to the lower surface 30b of the selector plate 30, 30A, or 30B, in the state in which the strut 12A, 12B, or 12C passes through the window hole 31, 31A, or 31B, and rises from the pocket plate 10 side to the notch plate 20 side, similar to the SOWC 1 of the first embodiment. With this configuration, the stroke amount of the actuator (not illustrated) that operates the arm 40 can be made short, and downsizing and cost reduction of the actuator can be achieved.

Further, the plane contact portion 124Cc provided in the groove portion 124C of the SOWC 1C according to the fourth embodiment may be provided in the groove portion 124A or 124B of the SOWC according to second or third embodiment. In this case, the plane contact portion 124Cc may just be provided in a position where the protruding portion 311A or 311B of the selector plate 30A or 30B comes in contact when the selector plate 30A or 30B is closed (when the SOWC is not engaged), on the bottom surface of the groove portion 124A or 124B of the second or third embodiment.

According to an embodiment, in the selectable one-way clutch, when the selectable one-way clutch is not engaged (when the selector plate is closed), the distance between the engaging piece and the notch plate becomes smaller than a conventional distance, and a rising angle of the engaging piece in overrun becomes smaller than a conventional rising angle. Therefore, according to the selectable one-way clutch, a bring-down speed of the engaging piece in overrun is more decreased when compared with a conventional case, and an impact force when the engaging piece performs a reciprocating collision between the notch plate and the pocket plate is reduced.

According to an embodiment, in the selectable one-way clutch, the bring-down speed of the engaging piece in overrun is more decreased when compared with a conventional case, and impact force when the engaging piece performs a reciprocating collision between the notch plate and the pocket plate is reduced.

According to an embodiment, in the selectable one-way clutch, the pair of ear portions, the pair of contact portions, and the plane portion are arranged side by side in the radial direction of the selectable one-way clutch, and the pair of contact portions is provided up to the end portion of the main body portion. Therefore, the mechanical strength near root portions between the main body portion and the pair of ear portions can be improved.

According to an embodiment, in the selectable one-way clutch, the pair of ear portions, the pair of contact portions, and the groove portion are arranged side by side in the radial direction of the selectable one-way clutch, and thus the protruding portion of the selector plate can be made short. Therefore, the rigidity and the durability of the protruding portion can be improved.

According to an embodiment, in the selectable one-way clutch, the pair of ear portions and the plane portion are arranged side by side in the radial direction of the selectable one-way clutch, and thus the protruding portion of the selector plate can be made short. Therefore, the rigidity and the durability of the protruding portion can be improved.

According to an embodiment, in the selectable one-way clutch, in a case where the selector plate is closed and the engaging piece is accommodated in the accommodating recessed portion, the lower surface of the selector plate and the plane contact portion of the engaging piece are in surface contact with each other, and the selector plate can resist spring force that raises the engaging piece, without external force. Therefore, drive force of an actuator that rotates the selector plate can be made small, and downsizing and cost reduction of the actuator can be achieved.

According to an embodiment, the selectable one-way clutch can decrease the amount of motion of the engaging piece in a yaw direction, and can sufficiently prevent the movement of the engaging piece in the yaw direction. Therefore, the selectable one-way clutch can further decrease yaw moment and translational force, and can further reduce the impact force when one or both of the pair of ear portions of the engaging piece collide with the inner surface of the accommodating recessed portion.

According to an embodiment, the selectable one-way clutch can make a drive angle of an arm that operate the selector plate smaller. Therefore, the drive force of the actuator that rotates the selector plate through the arm can be made smaller, and downsizing and cost reduction of the actuator can be achieved.

According to the selectable one-way clutch of the present disclosure, the impact force when the engaging piece performs the reciprocating collision between the notch plate and the pocket plate can be reduced, and an occurrence of the yaw moment and the translational force can be prevented, in overrun. Therefore, a decrease in the service lifetime of the engaging piece can be prevented, and the durability can be improved.

The invention claimed is:

1. A selectable one-way clutch comprising:
a pocket plate having a plurality of accommodating recessed portions formed on one surface;
engaging pieces that are accommodated in the respective accommodating recessed portions;
a notch plate relatively rotatable with respect to the pocket plate, and having a plurality of engaging recessed portions formed on a surface facing the one surface of the pocket plate; and
a selector plate positioned between the pocket plate and the notch plate, including a plurality of window holes penetrating the selector plate in a plate thickness direction, and configured to switch a state in which the engaging pieces pass through the window holes and rise from a side of the pocket plate to a side of the notch plate, and a state in which the engaging pieces are accommodated in the respective accommodating recessed portions, by being rotated coaxially with a rotation axis of the notch plate, wherein
the engaging pieces include respective groove portions formed in centers thereof in a peripheral direction of the selectable one-way clutch,
the selector plate includes a plurality of protruding portions each protruding from a respective inner surface of the window holes along a forming direction of each of the groove portions, and
the protruding portions are fit into the respective groove portions, and the engaging pieces and the selector plate are layered in a rotation axis direction of the selectable one-way clutch, when the selectable one-way clutch is not engaged.

2. The selectable one-way clutch according to claim 1, wherein
each of the engaging pieces includes
a main body portion extending along the peripheral direction of the selectable one-way clutch, and
a pair of ear portions extending in directions opposite to each other in a radical direction from one end portion in the peripheral direction of the main body portion, and serving as a rotation axis when the engaging piece rises, and
the main body portion includes
the groove portion formed along the peripheral direction, and
a pair of contact portions that comes in contact with the notch plate on both sides of the groove portion when the engaging piece passes through the window hole and rises from the side of the pocket plate to the side of the notch plate.

3. The selectable one-way clutch according to claim 2, wherein
a bottom surface of the groove portion includes a slope portion inclined with respect to an upper surface of the pair of ear portions, and a plane portion parallel to the upper surface of the pair of ear portions, and
the pair of ear portions, the contact portions, and the plane portion are positioned side by side in the radial direction.

4. The selectable one-way clutch according to claim 2, wherein
a bottom surface of the groove portion includes a slope portion inclined with respect to an upper surface of the pair of ear portions, and
the pair of ear portions, the pair of contact portions, and the groove portion are positioned side by side in the radial direction.

5. The selectable one-way clutch according to claim 2, wherein
a bottom surface of the groove portion includes a slope portion inclined with respect to an upper surface of the pair of ear portions,
the main body portion includes, between the pair of ear portions, a plane portion that connects upper surfaces of the pair of ear portions, and is connected with an end of the groove portion,
the pair of contact portions and the groove portion are positioned side by side in the radial direction, and
the pair of ear portions and the plane portion are positioned side by side in the radial direction.

6. The selectable one-way clutch according to claim 1, wherein
the groove portion includes a plane contact portion parallel to a lower surface of the selector plate, and
the plane contact portion is provided in a position where the protruding portion comes in contact when the selectable one-way clutch is not engaged, the position being of a bottom surface of the groove portion.

7. The selectable one-way clutch according to claim 1, wherein, in a radical direction, a gap between a side surface of the engaging piece and an inner surface of the window hole is smaller than a gap between the side surface of the engaging piece and a side surface of the accommodating recessed portion.

8. The selectable one-way clutch according to claim 1, wherein an angle of a bottom surface of the groove portion with respect to a lower surface of the selector plate is larger than an angle of an upper surface of the engaging piece with respect to the lower surface of the selector plate, in the state where the engaging piece passes through the window hole and rises from a side of the pocket plate to a side of the notch plate.

* * * * *